United States Patent [19]
Nishimura

[11] Patent Number: 5,060,301
[45] Date of Patent: Oct. 22, 1991

[54] OPTICAL REPEATED TRANSMISSION METHOD AND SYSTEM

[75] Inventor: Eiichi Nishimura, Tokyo, Japan

[73] Assignee: Oki Electric Industry Co., Ltd., Tokyo, Japan

[21] Appl. No.: 561,949

[22] Filed: Aug. 2, 1990

[30] Foreign Application Priority Data

Aug. 7, 1989 [JP] Japan ............................. 64-202814

[51] Int. Cl.$^5$ .......................................... H04B 10/00
[52] U.S. Cl. ................................... 359/179; 359/156; 359/122
[58] Field of Search ............... 455/601, 616, 617, 602, 455/612; 375/3; 370/2

[56] References Cited

U.S. PATENT DOCUMENTS

| | | | |
|---|---|---|---|
| 3,722,982 | 3/1973 | Brandt | 455/616 |
| 4,752,120 | 6/1988 | Shimizu | 455/616 |
| 4,900,917 | 2/1990 | Dixon et al. | 455/601 |
| 4,923,291 | 5/1990 | Edagawa et al. | 455/616 |

FOREIGN PATENT DOCUMENTS

| | | |
|---|---|---|
| 311331 | 12/1988 | Japan . |
| 26826 | 1/1989 | Japan . |
| 61079 | 3/1989 | Japan . |
| 61735 | 3/1989 | Japan . |

OTHER PUBLICATIONS

"Long-Span High Capacity Transmission System Experiments Employing Two Near-Travelling-Wave Laser Amplifiers" Malyon et al., Technical Digest of Ecoc '88, pp. 163-166, Sep. 1988.

Primary Examiner—Reinhard J. Eisenzopf
Assistant Examiner—Kinfe-Michael Negash
Attorney, Agent, or Firm—Spencer and Frank

[57] ABSTRACT

In a system of optical repeated transmission having a signal transmission path for transmitting signal light, and an optical repeater disposed in the signal transmission path, and directly amplifying the signal light, the amplification factor of the repeater is not dependent on the direction of polarization of the signal light that is input to it.

7 Claims, 4 Drawing Sheets

OPTICAL REPEATED TRANSMISSION METHOD AND SYSTEM

FIELD OF THE INVENTION

The present invention relates to a method of and a system for long-distance optical repeated transmission employing repeaters which directly amplify optical signals.

BACKGROUND OF THE INVENTION

In recent years, semiconductor lasers which directly amplify optical signals have been developed and their use for optical repeaters in long-distance optical transmission paths is contemplated and experiments therefor are considered.

FIG. 1 shows a schematic diagram of the experimental system for optical repeated transmission described in the ECOC '88 Technical Digest (September 1988). In the figure, the light signals from an optical transmitter 12 are passed through optical fibers 13, 16, 19 and 20, and through an optical filter 21, and are then input to an optical receiver 22. The attenuation due to the optical fibers 13, 16, 19 and 20 is compensated for by optical amplifiers 15 and 18. Polarization controllers 14 and 17 are provided in front of semiconductor lasers used as the optical amplifiers 15 and 18. This is because the optical amplifiers have different amplification factor depending on the direction of polarization of input light. A pulse pattern generator 11, a pattern demodulator 23, a clock generator PLL 24, and a bit error-rate detector 25 are also provided for measuring the bit error rate in the experimental system.

In the optical repeater transmission system described above, the polarization controllers disposed in front of the optical amplifiers are controlled by an electronic computer and the configuration of the repeater is therefore complicated and the repeater is therefore costly, and in addition, polarization control requires time on the order of seconds, and cannot follow rapid variations in the polarization state.

SUMMARY OF THE INVENTION

The present invention aims at solving the above problems and its object is to provide an optical repeated transmission method and system wherein the apparatus is not complicated, and repeated transmission is achieved without resorting to the a polarization controller which takes requires time to achieve control.

In the present invention, the above object is achieved by use, for optical transmission, of an optical repeater whose amplification factor does not depend on the direction of polarization of the input signal light.

In long-distance optical transmission, optical repeaters are inserted to compensate for the attenuation of signal light due to the optical transmission paths.

In the present invention, an optical amplifier whose amplification factor does not depend on the direction of polarization of the input signal light is used as a repeater. So, even if the state of the polarization of the signal light is changed during propagation, the signal light can be amplified with a constant amplification factor, and a stable optical repeated transmission path can be obtained.

DETAILED DESCRIPTION OF THE PREFERRED EMBODIMENTS

Figure 1:
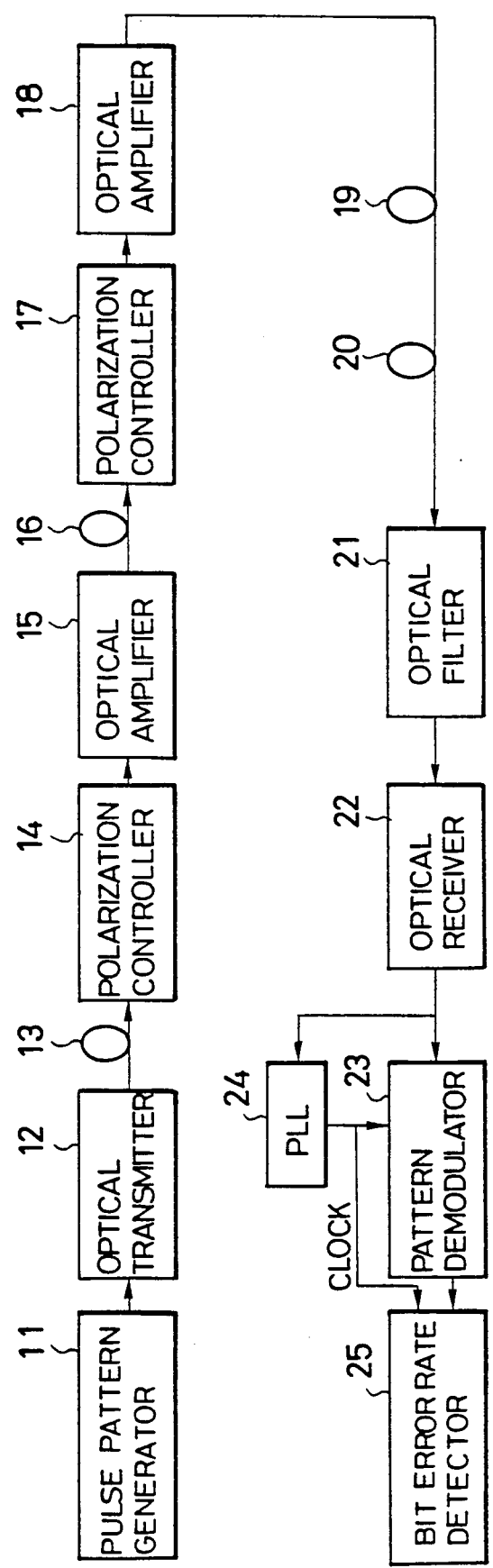
FIG. 1 shows a prior-art optical repeated transmission experimental system.
Figure 2:
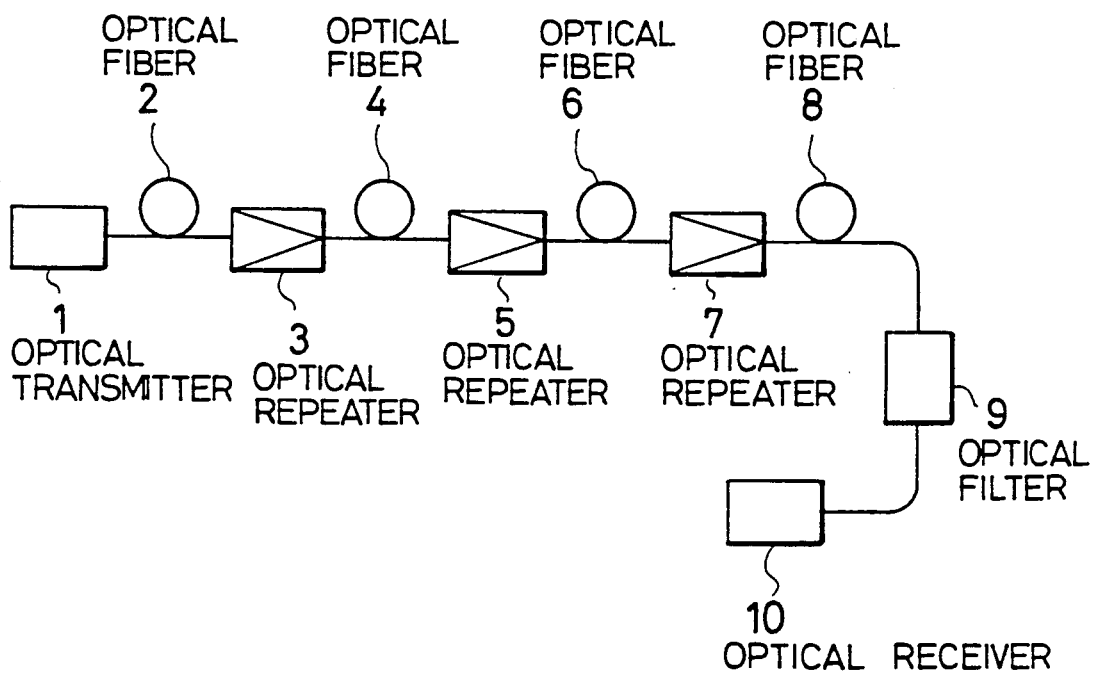
FIG. 2 shows an embodiment of the invention.

FIG. 2 shows an embodiment of the invention. Reference numeral 1 denotes an optical transmitter, 2, 4, 6 and 8 denote optical fibers constituting a transmission path. 3, 5 and 7 denote optical repeaters each employing an optical amplifier whose amplification factor does not depend on the direction of polarization of the signal light input thereto. 9 denotes an optical filter for removing noise, and 10 denotes an optical receiver.

Signal light emitted from the optical transmitter 1 is propagated through the optical fiber 2 and is input to the optical repeater 3. The optical repeater 3 amplifies the signal light that has been attenuated through the optical fiber 2 with an amplification factor which does depend on the variation in the state of the polarization. The amplified signal light is propagated through the optical fiber 4, is input to the optical repeater 5, and is then amplified in the optical repeater 5, and is then propagated through the optical fiber 6, the optical repeater 7 and the optical fiber 8. In this embodiment, three optical repeaters are provided, but the number of optical repeaters can be increased with the length of the transmission path. The signal light that has been passed through the last optical fiber 8, is passed through the optical filter 9, where noise components are reduced, and is input to the optical receiver 10 and is demodulated.

An embodiment of an optical repeater which can be used as the optical repeaters 3, 5 or 7 shown in FIG. 2 will now be described in detail with reference to FIG. 3.

Figure 3:
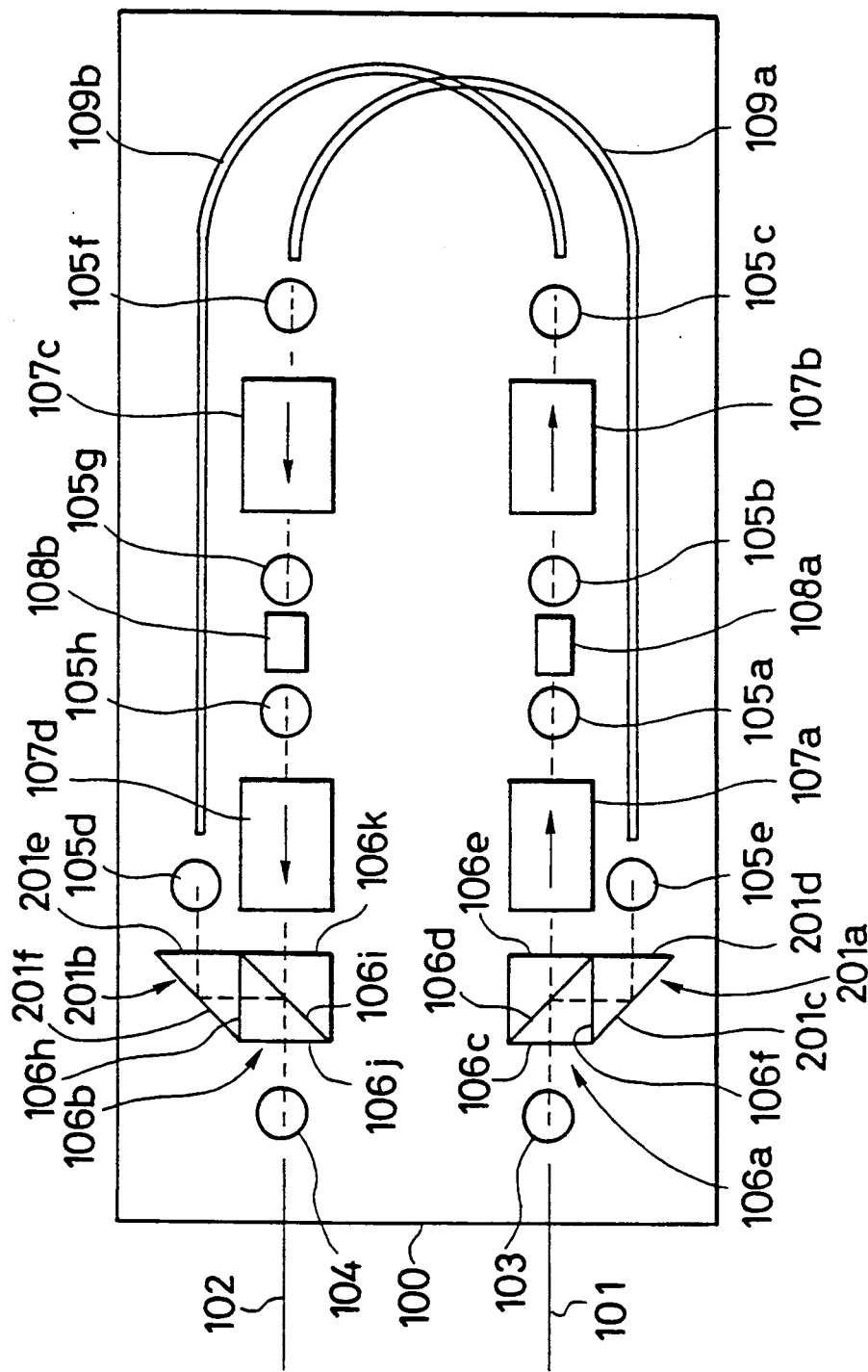
FIG. 3 shows an embodiment of the optical repeater.

As shown in FIG. 3, in this optical repeater, the signal light input through an input optical fiber 101 is directly amplified and output through an optical fiber 102. 103 is an input lens, 104 is an output lens, 105a to 105h are collimator lenses, 106a and 106b are first and second polarization beam splitters, 107a to 107d are isolators, 108a and 108b are amplifying elements, 109a and 109b are polarization maintaining fibers, 201a and 201b are rectangular prisms.

The signal light is input into the module 100 through the input optical fiber 101. The input lens 103 collimates the signal light.

The first polarization beam splitter 106a separates the signal light into first and second light components whose directions of polarization are orthogonal to each other. This separation is achieved in the following manner: The light signal input through an input surface 106c of the first polarization beam splitter 106a reaches a beam splitting plane 106d, where a first light component whose direction of electric field polarization is parallel to the incident plane (plane containing the incident light, the reflected light, and the light that has passed, i.e., the plane parallel to the face of the drawing) of the beam splitting plane 106d is passed through the beam splitting plane 106d, while a second light component whose direction of electric field polarization is perpendicular to the incident plane of the beam splitting plane 106d is reflected.

The first light component whose direction of electric field polarization is parallel to the incident plane of the beam splitting plane 106d is said to be P-polarized with respect to the beam splitting plane 106d or with respect to the first polarization beam splitter 106a. The second light component whose direction of polarization is perpendicular to the incident plane of the beam splitting plane 106d is said to be S-polarized with respect to the beam splitting plane 106d or with respect to the first polarization beam splitter 106a.

The first light component which has been passed through the beam splitting plane 106d is passed and emitted through a first output surface 106e.

The second light component which has been reflected at the beam splitting plane 106d is passed through an interface 106f between the first polarization beam splitter 106a and the rectangular prism 201a, thereby being input into the rectangular prism 201a, is reflected at a reflecting surface 201c so that its direction of travel is changed by 90 degrees, and is emitted from an output surface of the rectangular prism 201d.

The first polarization beam splitter 106a thus separates the first and the second light components.

The first light component of the input signal light from the first polarization beam splitter 106a is passed through the isolator 107a and is input into the collimator lens 105a.

The isolator 107a permits passage of light traveling in one or forward direction (from left to right in the figure, i.e., from the first polarization beam splitter 106a to the amplifying element 108a), but blocks light traveling in the other or backward direction (from right to left in the figure, i.e., from the amplifying element 108a to the first polarization beam splitter 106a). The isolator 107a thereby blocks spontaneous emission light that is emitted from the amplifying element 108a and travels towards the first polarization beam splitter 106a, thereby preventing the spontaneous emission light from reaching the input optical fiber 101.

The isolator 107a comprises a Faraday rotator, combined with a polarizer and an analyzer provided on input and output ends of the Faraday rotator, and has the function of rotating the direction of the polarization of light by 45 degrees.

The collimator lens 105a converges the input first light component so that the first light component is input to the amplifying element 108a.

The amplifying element 108a directly amplifies the first light component of the input signal light. The amplifying element 108a is disposed so that the first light component is input to it as TE-wave.

The collimator lens 105b collimates the first light component. The amplified and collimated first light component is then passed through the isolator 107b.

The isolator 107b permits passage of light traveling in one or forward direction (from left to right in the figure, i.e., from the amplifying element 108a to the polarization maintaining fiber 109b), but blocks light traveling in the other or backward direction (from right to left in the figure, i.e., from the polarization maintaining fiber 109b to the amplifying element 108a). The isolator 107b thereby blocks any light component which is reflected at the end of the polarization maintaining fiber 109b and traveling backward toward the amplifying element 108a.

The function of the isolators 107a and 107b is important in that the spontaneous emission light which originates from the amplifying element 108a, travels both forward and backward, and will be reflected at the ends of the input fiber 101, the polarization maintaining fiber 109b and the output fiber 102, is prevented from returning to the amplifying element 108a, and self-oscillation of the amplifying element 108a is thereby prevented.

The isolator 107b also comprises a Faraday rotator, combined with a polarizer and an analyzer provided on input and output ends of the Faraday rotator, and has the function of rotating the direction of the polarization of light by further 45 degrees.

The light output from the isolator 107b is coupled by the collimator lens 105c with the polarization maintaining fiber 109b. The polarization maintaining fiber 109b transmits the input light, while maintaining the direction of polarization of the input light. By the use of the polarization maintaining fiber, the light path within the module can be curved, and freedom in design is increased. Moreover, adjustment of the optical coupling within the module is facilitated. The first light component emitted from the polarization maintaining fiber 109b is collimated by the collimator lens 105d. The collimated light is passed through an input surface 201e of the rectangular prism 201b, thereby input into the rectangular prism 201b, is reflected at a reflecting plane 201f so that its direction of travel is changed by 90 degrees and is thereby directed toward a beam splitting plane 106i in the second polarization beam splitter 106b, is passed through an interface 106h between the rectangular prism 201b and the second polarization beam splitter 106b, and is reflected at the beam splitting plane 106i, and is emitted from an output surface 106j.

The second polarization beam splitter 106b acts as a means for merging the first and the second light components, as will be more apparent from the following description.

The second light component that is emitted out of the rectangular prism 201a is passed through the collimator lens 105e and is input into the polarization maintaining fiber 109a. The polarization maintaining fiber 109a is curved in U-shape, and the direction of travel of the second light component is changed by 180 degrees. The collimator lens 105f collimates the second light component emitted from the polarization maintaining fiber 109a. The collimated second light component is passed through the isolator 107c.

The isolator 107c permits passage of light traveling in one or forward direction (from right to left in the figure, i.e., from the polarization maintaining fiber 109a to the amplifying element 108b), but blocks light traveling in the other or backward direction (from left to right in the figure, i.e., from the amplifying element 108b to the polarization maintaining fiber 109a). The isolator 107c thereby blocks spontaneous emission light that is emitted from the amplifying element 108b and travels towards the polarization maintaining fiber 109a, thereby preventing the spontaneous emission light from reaching the input optical fiber 101.

The isolator 107c also comprises a Faraday rotator, combined with a polarizer and an analyzer provided on input and output ends of the Faraday rotator, and has the function of rotating the direction of the polarization of light by 45 degrees.

The second light component that is emitted from the isolator 107c is input to the collimator lens 105g.

The collimator lens 105g converges the second light component and inputs it to the amplifying element 108b. The amplifying element 108b directly amplifies the input second light component and emits it. The amplifying element 108b is disposed so that the second light component is input to it as TE-wave.

The collimator lens 105h collimates the emitted second light component. The amplified and collimated second light component is passed through the isolator 107d.

The isolator 107d permits passage of light traveling in one or forward direction (from right to left in the figure, i.e., from the amplifying element 108b to the second polarization beam splitter 106b), but blocks light traveling in the other or backward direction (from left to right in the figure, i.e., from the second polarization beam splitter 106b to the amplifying element 108b). The isolator 107d thereby blocks any light component which is reflected at the end of the output optical fiber 102 and traveling backward toward the amplifying element 108b.

The function of the isolators 107c and 107d is important in that the spontaneous emission light which originates from the amplifying element, travels forward and backward, and is reflected at the ends of the input fiber 101, the polarization maintaining fiber 109a and the output optical fiber 102, is prevented from returning to the amplifying element 108b, and self-oscillation of the amplifying element 108b is thereby prevented.

The isolator 107d also comprises a Faraday rotator, combined with a polarizer and an analyzer provided on input and output ends of the Faraday rotator, and has the function of rotating the direction of the polarization of light by further 45 degrees.

The second light component emitted from the isolator 107d is input through an input surface 106k, into the second polarization beam splitter 106b, and reaches the beam splitting plane 106i, is passed through the beam splitting plane 106i, and is emitted from the output surface 106j.

The first light component that is passed through the beam splitting plane 106d in the first polarization beam splitter 106a is reflected at the beam splitting plane 106i in the second polarization beam splitter 106b because the first light component is rotated at the isolators 107a and 107b by 90 degrees in total, so the first light component is S-polarized with respect to the beam splitting plane 106i. The second light component that is reflected at the beam splitting plane 106d in the first polarization beam splitter 106a is passed through the beam splitting plane 106i in the second polarization beam splitter 106b because the second light component is also rotated at the isolators 107c and 107d by 90 degrees in total, so the second light component is P-polarized with respect to the beam splitting plane 106i. In this way, the second polarization beam splitter 106b merges the first and the second light components, and emits the merged light through the output surface 106j.

In summary, the first light component and the second light component separated by the first polarization beam splitter 106a travel separate paths and are amplified in the amplifying elements 108a and 108b situated in the respective paths and are input to the second polarization beam splitter 106b. The second polarization beam splitter 106b merges the input first light component and the second light component and emits the merged light. The output lens 104 couples the merged light with the output optical fiber 102.

To minimize the reflection and possibility of self-oscillation of the amplifying elements, the collimator lenses 105a to 105h are preferably ball lenses and have a anti-reflection coating on their surfaces.

As has been described, the above optical repeater separates the signal light into a first light component and a second light component, and directly amplifies them separately, and merges them and outputs the merged light. The amplification factor is constant regardless of the direction of polarization of the signal light. Moreover, by virtue of the isolators inserted in front of and at the back of each amplifying element, part the of the spontaneous emission light that is reflected at the ends of the optical fibers is prevented from entering the amplifying element again. Accordingly, self-oscillation of the amplifying elements is prevented.

The experimental system of the embodiment shown in FIG. 2 will now be described. The implemented system had the following parameters. The wavelength of the emitted light was 1.3 $\mu$m, the output power was $-1$ dBm, the lengths of the optical fibers 2, 4, 6 and 8 were 50 km, 50 km, 50 km and 35 km, respectively, and the total length was 185 km. The amplification factors of the optical repeaters 3, 5 and 7 were 15 dB, 15 dB and 12 dB, respectively. The optical amplifiers identical to that shown in FIG. 3 were used as repeaters. The loss in the single mode optical fibers was 0.37 dB/km. The band-width of the optical filter was 3 nm.

Figure 4:
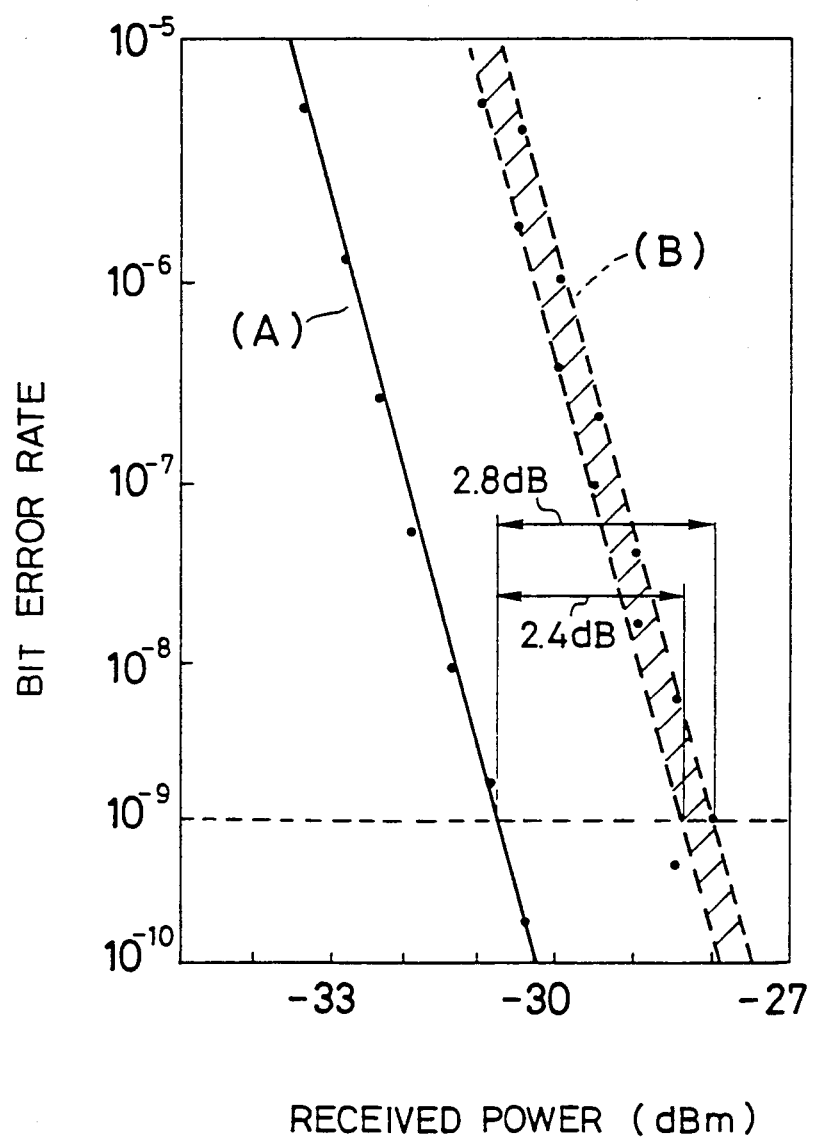
FIG. 4 shows error rate characteristics.

FIG. 4 shows the bit error rate characteristics. The horizontal axis represents the received power (dBm) of the optical receiver 10, and the vertical axis represents the bit error rate at the transmission rate 1.8 Gbit/second with respect to the received power. (A) represents the error rate characteristics for the case where the optical repeaters were not provided, and (B) represents the error rate characteristics for the implemented system with the above parameters, i.e., the case where the total length of the optical fiber is 185 km, and three optical repeaters are provided.

As is apparent from FIG. 4, the power penalty of the present experimental system was about 2.4 dB to 2.8 dB, and even when the optical fiber 1 was jiggled during transmission of the optical signal to vary the state of polarization, the variation the power penalty was as small as 0.4 dB, as indicated by hatching in FIG. 4 at (B), and thus extremely stable repeated transmission characteristics were obtained.

As has been described, according to the invention, optical repeaters whose amplification factor does not depend on the direction of polarization of the input optical signal are used to form an optical repeated transmission path, so that even if there is variation in the state of polarization due to jiggling of the optical fibers, stable optical repeated transmission is maintained.

Accordingly, polarization controllers need not be provided in front of the optical repeaters and the configuration of the system is simplified, and the operation of the system is facilitated.

What is claimed is:

1. An optical amplification system which comprises:
   a first polarization beam splitter for separating an input optical signal into a first light component and a second light component whose directions of polarization are orthogonal to each other;
   first and second amplifying elements which amplify said first and second light components, respectively;
   a second polarization beam splitter for merging into an output optical signal said first and second light components that have been amplified by said first and second amplifying elements;

a first isolator provided between said first polarization beam splitter and said first amplifying element;

a second isolator provided between said first amplifying element and said second polarization beam splitter;

a third isolator provided between said first polarization beam splitter and said second amplifying element;

a fourth isolator provided between said second amplifying element and said second polarization beam splitter;

said isolators permitting passage of light traveling in a forward direction from input to output and blocking light traveling in a backward direction from output to input;

each of said isolators rotating the direction of polarization of the light input into it by 45 degrees.

2. The system according to claim 1, further comprising polarization maintaining fibers for forming at least part of the light path between said first and second polarization beam splitters for transmission of said first and second light components.

3. The system according to claim 2, wherein the polarization maintaining fibers are provided between said first amplifying element and said second polarization beam splitter for the transmission of said first light component, and between said first polarization beam splitter and said second amplifying element for the transmission of said second light component.

4. The system according to claim 1, further comprising:

a first collimator lens inserted between said first isolator and said first amplifying element;

a second collimator lens inserted between said first amplifying element and said second isolator;

a third collimator lens inserted between said third isolator and said second amplifying element; and a fourth collimator lens inserted between said second amplifying element and said fourth isolator.

5. The system according to claim 4, further comprising:

an input lens provided at the input side of said first polarization beam splitter for collimating light from an input optical fiber and inputting it into the first polarization beam splitter; and an output lens provided at the output side of said second polarization beam splitter for coupling the light output from said second polarization beam splitter to an output optical fiber.

6. The system according to claim 4, further comprising:

a first polarization maintaining fiber provided between said first polarization beam splitter and said third isolator;

a second polarization maintaining fiber provided between said second isolator and said second polarization beam splitter;

a fifth collimator lens inserted between said second isolator and said second polarization maintaining fiber;

a sixth collimator lens inserted between said second polarization maintaining fiber and said second polarization beam splitter;

a seventh collimator lens inserted between said first polarization beam splitter and said first polarization maintaining fiber; and an eighth collimator lens inserted between the first polarization maintaining fiber and said third isolator.

7. The system according to claim 6, further comprising:

an input lens provided at the input side of said first polarization beam splitter for collimating a light from an input optical fiber and inputting it into the first polarization beam splitter; and an output lens provided at the output side of said second polarization beam splitter for coupling the light output from said second polarization beam splitter to an output optical fiber.

* * * * *